US008706387B2

(12) United States Patent
Moriya et al.

(10) Patent No.: US 8,706,387 B2
(45) Date of Patent: Apr. 22, 2014

(54) CONTROL DEVICE AND CONTROL METHOD FOR ENGINE, AND VEHICLE

(75) Inventors: Kouki Moriya, Aichi-gun (JP); Jumpei Kakehi, Toyota (JP); Hasrul Sany Bin Hashim, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/818,721

(22) PCT Filed: Feb. 18, 2011

(86) PCT No.: PCT/JP2011/053511
§ 371 (c)(1),
(2), (4) Date: Feb. 25, 2013

(87) PCT Pub. No.: WO2012/111143
PCT Pub. Date: Aug. 23, 2012

(65) Prior Publication Data

US 2013/0158842 A1 Jun. 20, 2013

(51) Int. Cl.
*G06F 19/00* (2011.01)

(52) U.S. Cl.
USPC ...................... 701/113; 123/179.3; 123/179.4

(58) Field of Classification Search
USPC ...................... 701/113, 22; 123/179.3, 179.4; 180/65.21, 65.29
See application file for complete search history.

(56) References Cited

U.S. PATENT DOCUMENTS

| | | | | |
|---|---|---|---|---|
| 8,554,453 | B2 * | 10/2013 | Moriya et al. | 701/113 |
| 2010/0050970 | A1 | 3/2010 | Okumoto et al. | |

FOREIGN PATENT DOCUMENTS

| | | |
|---|---|---|
| EP | 2 159 410 | 3/2010 |
| JP | 10-47105 A | 2/1998 |
| JP | 2008-114752 A | 5/2008 |
| JP | 2008-291661 A | 12/2008 |
| JP | 2010 24906 | 2/2010 |
| JP | 2010-236533 A | 10/2010 |

OTHER PUBLICATIONS

International Search Report Issued May 17, 2011 in PCT/JP11/53511 Filed Feb. 18, 2011.

* cited by examiner

*Primary Examiner* — John Kwon
(74) *Attorney, Agent, or Firm* — Oblon, Spivak, McClelland, Maier & Neustadt, L.L.P.

(57) ABSTRACT

When a predetermined stop condition is satisfied, an engine is stopped. When a predetermined start condition is satisfied, a motor in a starter is driven and the engine is started. When a voltage of a battery for supplying electric power to the motor becomes lower than a threshold value while the motor is driven, stoppage of the engine is thereafter restricted. The threshold value increases as an engine rotation speed at the time when the motor is driven increases.

7 Claims, 11 Drawing Sheets

CONTROL DEVICE AND CONTROL METHOD FOR ENGINE, AND VEHICLE

TECHNICAL FIELD

The present invention relates to a control device and a control method for an engine, and a vehicle, and particularly to a technique for restricting idling-stop or economy-running of the engine.

BACKGROUND ART

In order to improve fuel efficiency or reduce exhaust emission, some cars having an engine such as an internal combustion engine include what is called an idling-stop or economy-running function, in which an engine is automatically stopped while a vehicle stops and a driver operates a brake pedal, and the vehicle is automatically re-started, for example, by a driver's operation for re-start such as decrease in an amount of operation of a brake pedal to zero.

In a vehicle including the idling-stop or economy-running function, due to drive of a starter in re-starting the engine after it is stopped, a voltage of a battery for supplying electric power to the starter may lower. As the voltage of the battery lowers, a memory in an ECU (Electronic Control Unit) may be reset.

In consideration of such facts, Japanese Patent Laying-Open No. 2010-24906 (PTL 1) discloses permission of idling-stop in a case where a lowest voltage of a battery at the time when an internal combustion engine is automatically started is expected to be equal to or higher than a threshold voltage.

CITATION LIST

Patent Literature

PTL 1: Japanese Patent Laying-Open No. 2010-24906

SUMMARY OF INVENTION

Technical Problem

In a case where an engine is re-started before an engine rotation speed attains to zero, load imposed on a starter is lower than in a case where the engine is re-started after the engine rotation speed has attained to zero. Therefore, in the case where the engine is re-started before the engine rotation speed attains to zero, an amount of lowering in voltage of a battery is smaller than in the case where the engine is re-started after the engine rotation speed has attained to zero. Thus, even when the voltage of the battery is insufficient, a lowest voltage of the battery at the time when the engine is re-started can be equal to or higher than a threshold voltage. Therefore, idling-stop can be carried out in such a situation that idling-stop should be restricted.

An object of the present invention is to restrict stop of an engine when a voltage of a battery is insufficient.

Solution to Problem

In one embodiment, a control device for an engine, with which the engine is stopped when a predetermined stop condition is satisfied and cranked by a motor when a predetermined start condition is satisfied after it is stopped, includes a control unit that restricts stop of the engine after a voltage of a battery for supplying electric power to the motor becomes lower than a threshold value while the motor is driven and the engine is cranked. The threshold value increases as a rotation speed of the engine at the time when the motor is driven increases.

According to this embodiment, the threshold value for restricting stop of the engine is higher as the rotation speed of the engine at the time when the motor is driven is higher. Therefore, even when an amount of lowering in voltage at the time when the motor is driven while the rotation speed of the engine is high is smaller than an amount of lowering in voltage at the time when the motor is driven while the rotation speed of the engine is low, with the voltage of the battery being insufficient, the voltage of the battery can be lower than the threshold value. Therefore, stop of the engine is thereafter restricted.

In another embodiment, the engine is provided with a starter including a second gear that can be engaged with a first gear coupled to a crankshaft and an actuator that moves, in a driven state, the second gear to a position where the second gear is engaged with the first gear. The motor rotates the second gear. The control unit includes a first mode in which the motor is driven before the actuator is driven and a second mode in which the second gear is engaged with the first gear by the actuator before the motor is driven. The actuator and the motor are driven in the first mode at a rotation speed higher than the rotation speed of the engine at the time when the actuator and the motor are driven in the second mode.

According to this embodiment, in the case where the rotation speed of the engine is high, the motor is driven before engagement between the first gear and the second gear. Thus, the first gear and the second gear are engaged with each other after difference in the number of revolutions between the first gear and the second gear is made smaller. Therefore, the first gear and the second gear are smoothly engaged with each other. Thus, even in such a state that the rotation speed of the engine is high, cranking can be started in order to start the engine. In such an engine, a threshold value for restricting stop of the engine is higher as the rotation speed of the engine at the time when the motor is driven is higher. Therefore, even when an amount of lowering in voltage at the time when the engine is cranked in the first mode is smaller than an amount of lowering in voltage at the time when the engine is cranked in the second mode, with the voltage of the battery being insufficient, the voltage of the battery can be lower than the threshold value while the engine is cranked in the first mode. Therefore, stop of the engine is thereafter restricted.

In yet another embodiment, the threshold value includes a threshold value used in the first mode and a threshold value used in the second mode. The threshold value used in the first mode is higher than the threshold value used in the second mode.

In yet another embodiment, the actuator and the motor are driven in the second mode when the rotation speed of the engine is higher than zero and equal to or lower than a predetermined rotation speed at the time when the start condition is satisfied. The control unit includes, in addition to the first mode and the second mode, a third mode in which the second gear is engaged with the first gear by the actuator before the motor is driven when the rotation speed of the engine is zero at the time when the start condition is satisfied. The threshold value includes a threshold value used in the first mode, a threshold value used in the second mode, and a threshold value used in the third mode. The threshold value used in the first mode is higher than the threshold value used in the second mode. The threshold value used in the second mode is higher than the threshold value used in the third mode.

In yet another embodiment, the actuator and the motor are driven in the second mode when the rotation speed of the engine is higher than zero and equal to or lower than a predetermined rotation speed at the time when the start condition is satisfied. The control unit includes, in addition to the first mode and the second mode, a third mode in which the second gear is engaged with the first gear by the actuator before the motor is driven when the rotation speed of the engine is zero at the time when the start condition is satisfied. The threshold value includes a threshold value used in the second mode and a threshold value used in the third mode. The threshold value used in the second mode is higher than the threshold value used in the third mode.

In yet another embodiment, the actuator and the motor are driven in the second mode when the rotation speed of the engine is higher than zero and equal to or lower than a predetermined rotation speed at the time when the start condition is satisfied. The control unit includes, in addition to the first mode and the second mode, a third mode in which the second gear is engaged with the first gear by the actuator before the motor is driven when the rotation speed of the engine is zero at the time when the start condition is satisfied. The threshold value includes a threshold value used in the first mode and a threshold value used in the third mode. The threshold value used in the first mode is higher than the threshold value used in the third mode.

According to these embodiments, a threshold value for restricting stop of the engine is determined for each control mode. Therefore, even though the rotation speed of the engine lowers by the time of start of cranking, for example, due to delay in operation of the actuator or the motor, or the like, whether or not to restrict stop of the engine is determined with the use of a threshold value properly determined for each control mode. For example, even though the rotation speed of the engine lowers by the time of start of cranking at the time when the actuator and the motor are driven in the first mode, a relatively low threshold value determined for the second mode is not employed. Therefore, even though an amount of lowering in voltage at the time when the engine is cranked in the first mode is small, with the voltage of the battery being insufficient, the voltage of the battery can be lower than the threshold value while the engine is cranked in the first mode. Similarly, even though the rotation speed of the engine lowers by the time of start of cranking at the time when the actuator and the motor are driven in the second mode, a relatively low threshold value determined for the third mode is not employed. Therefore, even though an amount of lowering in voltage at the time when the engine is cranked in the second mode is small, with the voltage of the battery being insufficient, the voltage of the battery can be lower than the threshold value while the engine is cranked in the third mode. Therefore, stop of the engine is thereafter restricted.

Advantageous Effects of Invention

A threshold value for restricting stop of the engine is higher as the engine rotation speed at the time when the motor is driven is higher. Therefore, even when an amount of lowering in voltage at the time when the motor is driven while the engine rotation speed is high is smaller than an amount of lowering in voltage at the time when the motor is driven while the engine rotation speed is low, with the voltage of the battery being insufficient, the voltage of the battery can be lower than the threshold value. Therefore, even though a stop condition is thereafter satisfied, the engine is continuously operated.

DESCRIPTION OF EMBODIMENTS

Figure 1:
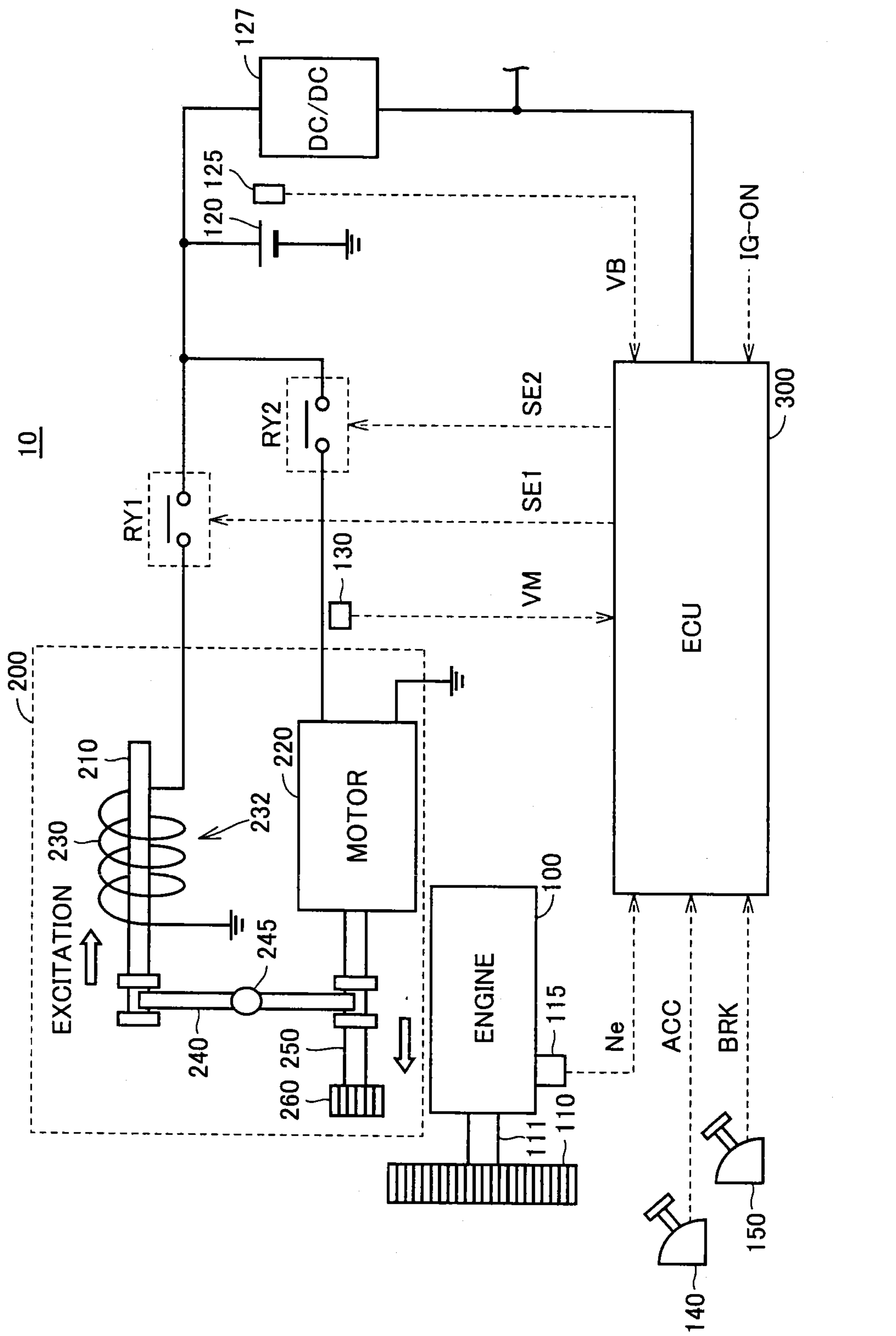
FIG. 1 is an overall block diagram of a vehicle in a first embodiment.

An embodiment of the present invention will be described hereinafter with reference to the drawings. In the description below, the same elements have the same reference characters allotted. Their label and function are also identical. Therefore, detailed description thereof will not be repeated.

First Embodiment

FIG. 1 is an overall block diagram of a vehicle 10. Referring to FIG. 1, vehicle 10 includes an engine 100, a battery 120, a starter 200, an ECU 300, and relays RY1, RY2. Starter 200 includes a plunger 210, a motor 220, a solenoid 230, a coupling portion 240, an output member 250, and a pinion gear 260.

Engine 100 generates driving force for running vehicle 10. A crankshaft 111 of engine 100 is connected to a drive wheel, with a powertrain structured to include a clutch, a reduction gear, or the like being interposed.

Engine 100 is provided with a rotation speed sensor 115. Rotation speed sensor 115 detects a rotation speed Ne of engine 100 and outputs a detection result to ECU 300.

Battery 120 is an electric power storage element configured such that it can be charged and can discharge. Battery 120 is configured to include a secondary battery such as a lithium ion battery, a nickel metal hydride battery, a lead-acid battery, or the like. Alternatively, battery 120 may be implemented by a power storage element such as an electric double layer capacitor.

Battery 120 is connected to starter 200 with relays RY1, RY2 controlled by ECU 300 being interposed. Battery 120 supplies a supply voltage for driving to starter 200 as relays RY1, RY2 are closed. It is noted that a negative electrode of battery 120 is connected to a body earth of vehicle 10.

Battery 120 is provided with a voltage sensor 125. Voltage sensor 125 detects an output voltage VB of battery 120 and outputs a detection value to ECU 300.

A voltage of battery 120 is supplied to ECU 300 and such auxiliary machinery as an inverter of an air-conditioning apparatus through a DC/DC converter 127.

Relay RY1 has one end connected to a positive electrode of battery 120 and the other end connected to one end of solenoid 230 within starter 200. Relay RY1 is controlled by a control signal SE1 from ECU 300 so as to switch between supply and cut-off of a supply voltage from battery 120 to solenoid 230.

Relay RY2 has one end connected to the positive electrode of battery 120 and the other end connected to motor 220 within starter 200. Relay RY2 is controlled by a control signal SE2 from ECU 300 so as to switch between supply and cut-off of a supply voltage from battery 120 to motor 220. In addition, a voltage sensor 130 is provided in a power line connecting relay RY2 and motor 220 to each other. Voltage sensor 130 detects a motor voltage VM and outputs a detection value to ECU 300.

As described above, supply of a supply voltage to motor 220 and solenoid 230 within starter 200 can independently be controlled by relays RY1, RY2.

Output member 250 is coupled to a rotation shaft of a rotor (not shown) within the motor, for example, by a straight spline or the like. In addition, pinion gear 260 is provided on an end portion of output member 250 opposite to motor 220. As relay RY2 is closed, the supply voltage is supplied from battery 120 so as to rotate motor 220. Then, output member 250 transmits the rotational operation of the rotor to pinion gear 260, to thereby rotate pinion gear 260.

As described above, solenoid 230 has one end connected to relay RY1 and the other end connected to the body earth. As relay RY1 is closed and solenoid 230 is excited, solenoid 230 attracts plunger 210 in a direction of an arrow. Namely, plunger 210 and solenoid 230 constitute an actuator 232.

Plunger 210 is coupled to output member 250 with coupling portion 240 being interposed. As solenoid 230 is excited, plunger 210 is attracted in the direction of the arrow. Thus, coupling portion 240 of which fulcrum 245 is fixed moves output member 250 from a stand-by position shown in FIG. 1 in a direction reverse to a direction of operation of plunger 210, that is, a direction in which pinion gear 260 moves away from a main body of motor 220. In addition, biasing force reverse to the arrow in FIG. 1 is applied to plunger 210 by a not-shown spring mechanism, and when solenoid 230 is no longer excited, it returns to the stand-by position.

As output member 250 thus operates in an axial direction as a result of excitation of solenoid 230, pinion gear 260 is engaged with ring gear 110 provided around an outer circumference of a flywheel or a drive plate attached to crankshaft 111 of engine 100. Then, as pinion gear 260 performs a rotational operation while pinion gear 260 and ring gear 110 are engaged with each other, engine 100 is cranked and started.

Thus, in the present embodiment, actuator 232 for moving pinion gear 260 so as to be engaged with ring gear 110 provided around the outer circumference of the flywheel or the drive plate of engine 100 and motor 220 for rotating pinion gear 260 are individually controlled.

Though not shown in FIG. 1, a one-way clutch may be provided between output member 250 and a rotor shaft of motor 220 such that the rotor of motor 220 does not rotate due to the rotational operation of ring gear 110.

In addition, actuator 232 in FIG. 1 is not limited to the mechanism as above so long as it is a mechanism capable of transmitting rotation of pinion gear 260 to ring gear 110 and switching between a state that pinion gear 260 and ring gear 110 are engaged with each other and a state that they are not engaged with each other. For example, such a mechanism that pinion gear 260 and ring gear 110 are engaged with each other as a result of movement of the shaft of output member 250 in a radial direction of pinion gear 260 is also applicable.

ECU 300 includes a CPU (Central Processing Unit), a storage device, and an input/output buffer, none of which is shown, and receives input from each sensor or provides output of a control command to each piece of equipment. It is noted that control of these components is not limited to processing by software, and a part thereof may also be constructed by dedicated hardware (electronic circuitry) and processed.

ECU 300 receives a signal ACC indicating an amount of operation of an accelerator pedal 140 from a sensor (not shown) provided on accelerator pedal 140. ECU 300 receives a signal BRK indicating an amount of operation of a brake pedal 150 from a sensor (not shown) provided on brake pedal 150. In addition, ECU 300 receives a start operation signal IG-ON issued in response to a driver's ignition operation or the like. Based on such information, ECU 300 generates a signal requesting start of engine 100 and a signal requesting stop thereof and outputs control signal SE1, SE2 in accordance therewith, so as to control an operation of starter 200.

For example, when such a stop condition that a vehicle stops, brake pedal 150 is operated by a driver, and stop of engine 100 is not restricted (is permitted) is satisfied, a stop request signal is generated and ECU 300 causes engine 100 to stop. Namely, when a stop condition is satisfied, fuel injection and combustion in engine 100 is stopped.

Thereafter, when such a start condition that an amount of operation of brake pedal 150 by the driver has attained to zero is satisfied, a start request signal is generated and ECU 300 drives motor 220 and cranks engine 100. Alternatively, engine 100 may be cranked when accelerator pedal 140, a shift lever for selecting a shift range or a gear, or a switch for selecting a vehicle running mode (such as a power mode or an eco mode) is operated.

When a condition for starting engine 100 is satisfied, ECU 300 controls actuator 232 and motor 220 in any one mode of a second mode in which actuator 232 and motor 220 are controlled such that pinion gear 260 starts to rotate after pinion gear 260 moved toward ring gear 110 and a first mode in which actuator 232 and motor 220 are controlled such that pinion gear 260 moves toward ring gear 110 after pinion gear 260 started to rotate.

As will be described later, when engine rotation speed Ne is equal to or lower than a predetermined first reference value $\alpha 1$, ECU 300 controls actuator 232 and motor 220 in the second mode. When engine rotation speed Ne is higher than first reference value $\alpha 1$, ECU 300 controls actuator 232 and motor 220 in the second mode.

Figure 2:
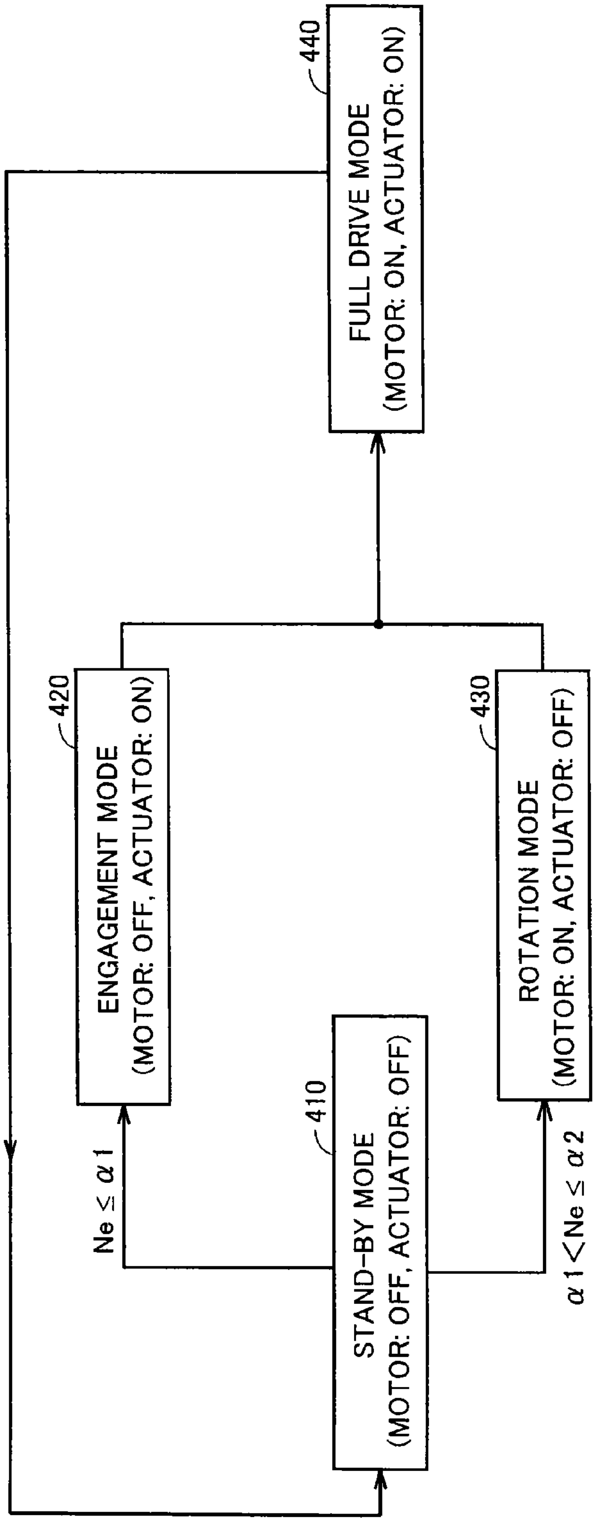
FIG. 2 is a diagram for illustrating transition of an operation mode of a starter.

FIG. 2 is a diagram for illustrating transition of an operation mode of starter 200 in the present embodiment. The operation mode of starter 200 in the present embodiment includes a stand-by mode 410, an engagement mode 420, a rotation mode 430, and a full drive mode 440.

The second mode described previously is a mode in which transition to full drive mode 440 is made via engagement mode 420. The first mode is a mode in which transition to full drive mode 440 is made via rotation mode 430.

Stand-by mode 410 represents such a state that neither of actuator 232 and motor 220 in starter 200 is driven, that is, a state that an engine start request to starter 200 is not output. Stand-by mode 410 corresponds to the initial state of starter 200, and it is selected when drive of starter 200 is not necessary, for example, before an operation to start engine 100, after completion of start of engine 100, failure in starting engine 100, and the like.

Full drive mode 440 represents such a state that both of actuator 232 and motor 220 in starter 200 are driven. In this full drive mode 440, motor 220 rotates pinion gear 260 while pinion gear 260 and ring gear 110 are engaged with each other. Thus, engine 100 is actually cranked and the operation for start is started.

As described above, starter 200 in the present embodiment can independently drive each of actuator 232 and motor 220. Therefore, in a process of transition from stand-by mode 410 to full drive mode 440, there are a case where actuator 232 is driven prior to drive of motor 220 (that is, corresponding to engagement mode 420) and a case where motor 220 is driven prior to drive of actuator 232 (that is, corresponding to rotation mode 430).

Selection between these engagement mode 420 and rotation mode 430 is basically made based on rotation speed Ne of engine 100 when re-start of engine 100 is requested.

Engagement mode 420 refers to a state where only actuator 232 is driven and motor 220 is not driven. This mode is selected when pinion gear 260 and ring gear 110 can be engaged with each other even while pinion gear 260 remains stopped. Specifically, while engine 100 remains stopped or while rotation speed Ne of engine 100 is sufficiently low (Ne≤first reference value $\alpha$1), this engagement mode 420 is selected.

Meanwhile, rotation mode 430 refers to a state where only motor 220 is driven and actuator 232 is not driven. This mode is selected, for example, when a request for re-start of engine 100 is output immediately after stop of engine 100 is requested and when rotation speed Ne of engine 100 is relatively high ($\alpha$1<Ne≤a second reference value $\alpha$2).

Thus, when rotation speed Ne of engine 100 is high, difference in speed between pinion gear 260 and ring gear 110 is great while pinion gear 260 remains stopped, and engagement between pinion gear 260 and ring gear 110 may become difficult. Therefore, in rotation mode 430, only motor 220 is driven prior to drive of actuator 232, so that a rotation speed of ring gear 110 and a rotation speed of pinion gear 260 are in synchronization with each other. Then, in response to difference between the rotation speed of ring gear 110 and the rotation speed of pinion gear 260 being sufficiently small, actuator 232 is driven and ring gear 110 and pinion gear 260 are engaged with each other. Then, the operation mode makes transition from rotation mode 430 to full drive mode 440.

In the case of full drive mode 440, the operation mode returns from full drive mode 440 to stand-by mode 410 in response to completion of start of engine 100 and start of a self-sustained operation of engine 100.

Thus, when a signal requesting start of engine 100 is output, that is, when it is determined that engine 100 is to be started, actuator 232 and motor 220 are controlled in any one mode of the second mode in which transition to full drive mode 440 is made via engagement mode 420 and the first mode in which transition to full drive mode 440 is made via rotation mode 430.

Figure 3:
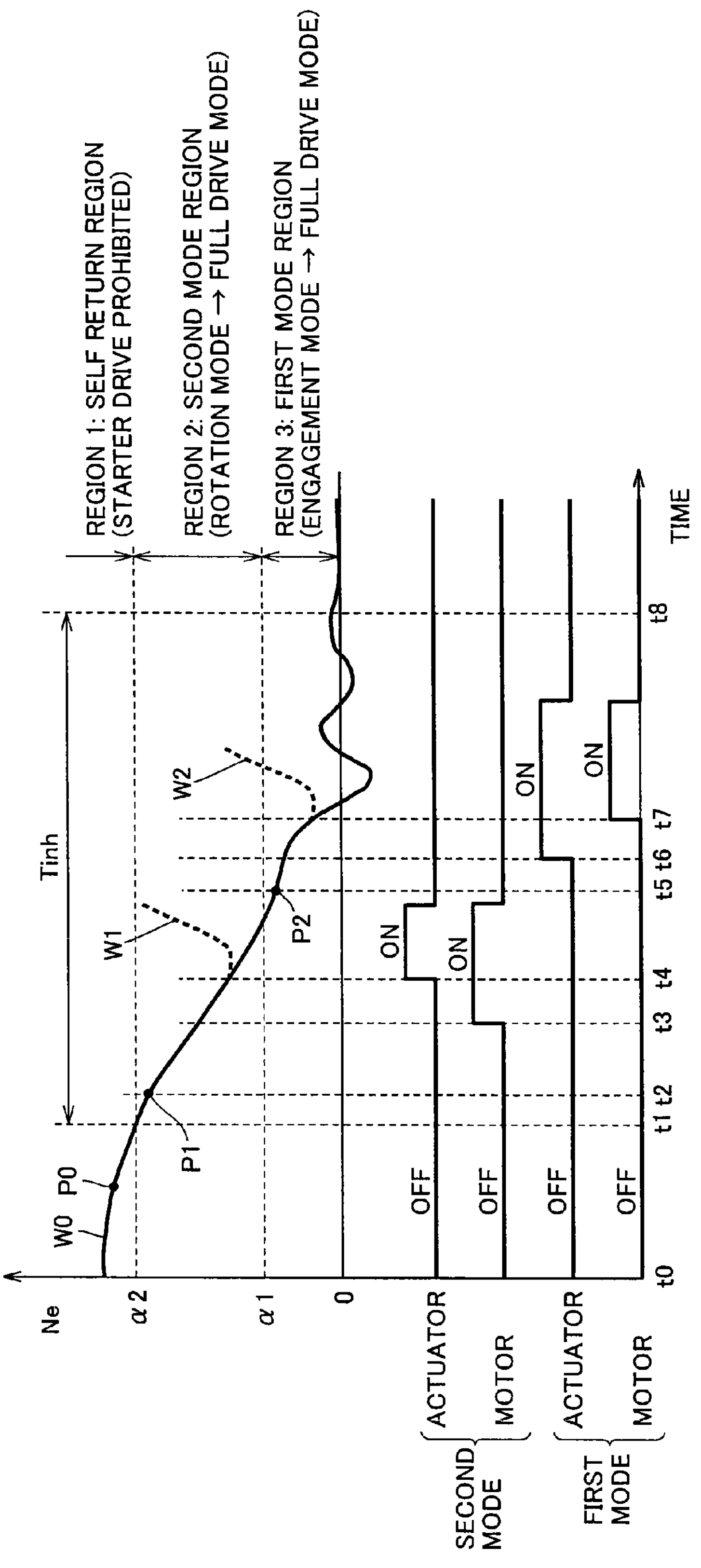
FIG. 3 is a diagram for illustrating a drive mode in an engine start operation.

FIG. 3 is a diagram for illustrating two drive modes (the first mode, the second mode) in an engine start operation in the present embodiment.

In FIG. 3, the abscissa indicates time and the ordinate indicates rotation speed Ne of engine 100 and a state of drive of actuator 232 and motor 220 in the first mode and the second mode.

A case where, at a time t0, for example, such a stop condition that the vehicle stops and the driver operates brake pedal 150 is satisfied and consequently a request to stop engine 100 is generated and engine 100 is stopped (fuel injection and ignition are stopped) is considered. Here, unless engine 100 is re-started, rotation speed Ne of engine 100 gradually lowers as shown with a solid curve W0 and finally rotation of engine 100 stops.

Then, a case where, for example, such a start condition that an amount of the driver's operation of brake pedal 150 attains to zero while rotation speed Ne of engine 100 is lowering is satisfied and thus a request to re-start engine 100 is generated is considered. Here, categorization into three regions based on rotation speed Ne of engine 100 is made.

A first region (region 1) refers to a case where rotation speed Ne of engine 100 is higher than second reference value $\alpha$2, and for example, such a state that the start condition is satisfied and a request for re-start is generated at a point P0 in FIG. 3.

This region 1 is a region where engine 100 can be started by a fuel injection and ignition operation without using starter 200 because rotation speed Ne of engine 100 is sufficiently high. Namely, region 1 is a region where engine 100 can return by itself. Therefore, in region 1, drive of starter 200 is restricted, or more specifically, prohibited. It is noted that second reference value $\alpha$2 described above may be restricted depending on a maximum rotation speed of motor 220.

A second region (region 2) refers to a case where rotation speed Ne of engine 100 is located between first reference value $\alpha$1 and second reference value $\alpha$2, and such a state that the start condition is satisfied and a request for re-start is generated at a point P1 in FIG. 3.

This region 2 is a region where rotation speed Ne of engine 100 is relatively high, although engine 100 cannot return by itself. In this region, the rotation mode is selected as described with reference to FIG. 2.

When a request to re-start engine 100 is generated at a time t2, initially, motor 220 is driven after lapse of a prescribed time period. Thus, pinion gear 260 starts to rotate. Then, at a time t4, actuator 232 is driven. When ring gear 110 and pinion gear 260 are engaged with each other, engine 100 is cranked and rotation speed Ne of engine 100 increases as shown with a dashed curve W1. Thereafter, when engine 100 resumes the self-sustained operation, drive of actuator 232 and motor 220 is stopped.

A third region (region 3) refers to a case where rotation speed Ne of engine 100 is lower than first reference value $\alpha$1, and for example, such a state that the start condition is satisfied and a request for re-start is generated at a point P2 in FIG. 3.

This region 3 is a region where rotation speed Ne of engine 100 is low and pinion gear 260 and ring gear 110 can be engaged with each other without synchronizing pinion gear 260. In this region, the engagement mode is selected as described with reference to FIG. 2.

When a request to re-start engine 100 is generated at a time t5, initially, actuator 232 is driven after lapse of a prescribed time period. Thus, pinion gear 260 is pushed toward ring gear 110. Motor 220 is thereafter driven (at a time t7 in FIG. 3). Thus, engine 100 is cranked and rotation speed Ne of engine 100 increases as shown with a dashed curve W2. Thereafter, when engine 100 resumes the self-sustained operation, drive of actuator 232 and motor 220 is stopped.

By thus controlling re-start of engine 100 by using starter 200 in which actuator 232 and motor 220 can independently be driven, engine 100 can be re-started in a shorter period of time than in a case of a conventional starter where an operation to re-start engine 100 was prohibited during a period (Tinh) from a rotation speed at which return of engine 100 by itself was impossible (a time t1 in FIG. 3) to stop of engine 100 (a time t8 in FIG. 3). Thus, the driver's uncomfortable feeling due to delayed re-start of the engine can be lessened.

Figure 4:
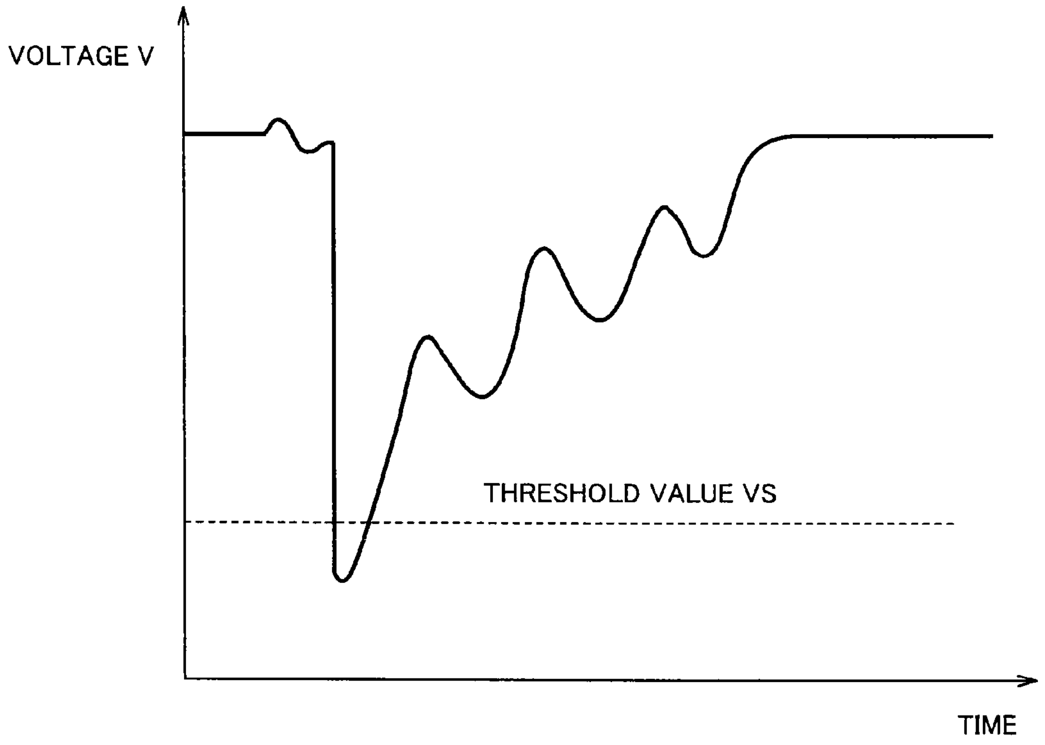
FIG. 4 is a diagram (No. 1) showing a voltage of a battery.

As shown in FIG. 4, when engine 100 is re-started, a voltage of battery 120 for supplying electric power to motor 220 may temporarily lower due to drive of motor 200. Since battery 120 supplies electric power not only to motor 220 but also to auxiliary machinery, lowering in voltage of battery 120 is undesirable.

Then, in the present embodiment, when a voltage of battery 120 becomes lower than a threshold value VS while motor 220 is driven, stop of engine 100 is thereafter restricted. More specifically, automatic stop of engine 100, that is, idling-stop or economy-running, is prohibited. Automatic stop of engine 100 may be made less frequent. For example, when a lowest value of the voltage of battery 120 while motor 220 is driven is equal to or lower than threshold value VS, it is determined that the voltage of battery 120 has become lower than threshold value VS.

Idling-stop or economy-running may be restricted until an IG-OFF signal is received next or until a memory in ECU 300 is reset as a result of replacement of battery 120.

Figure 5:
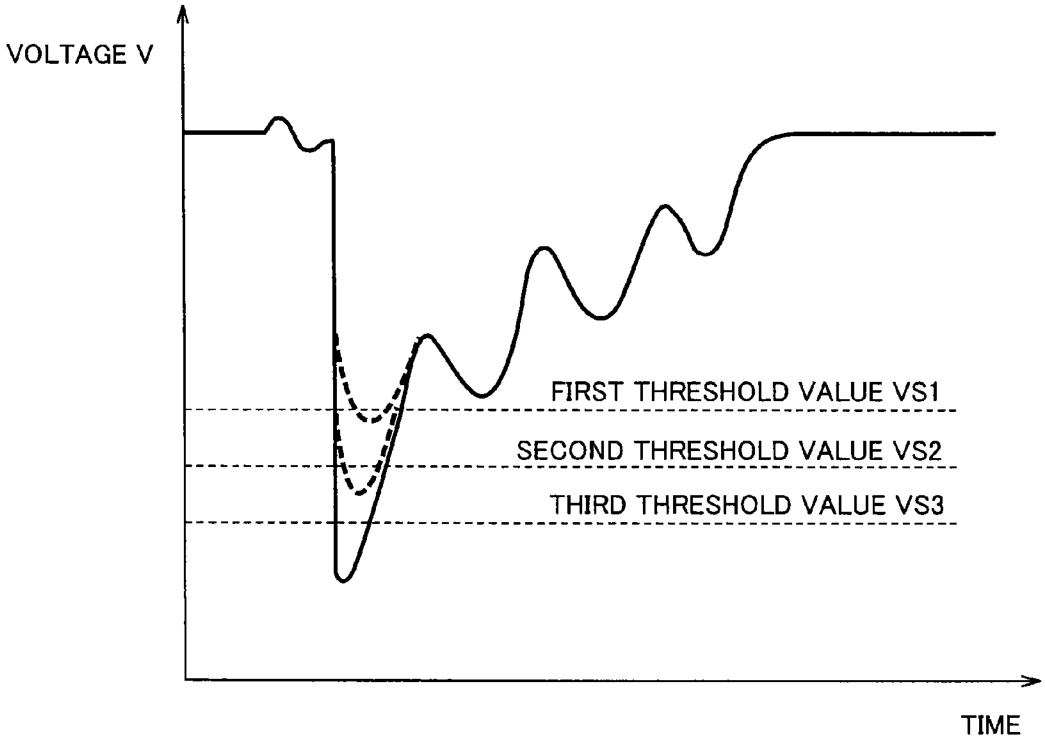
FIG. 5 is a diagram (No. 2) showing a voltage of the battery.

An amount of lowering in voltage of battery 120 varies in accordance with engine rotation speed Ne at the time when motor 220 is driven. As engine rotation speed Ne at the time when motor 220 is driven is high, load imposed on motor 220 can be low. Therefore, as shown with a dashed line in FIG. 5, as engine rotation speed Ne at the time when motor 220 is driven is higher, an amount of lowering in voltage can be small.

In consideration of such facts, in the present embodiment, a different threshold value VS is used in accordance with engine rotation speed Ne at the time when motor 220 is driven. Namely, different threshold values VS are used in a case where actuator 232 and motor 220 are controlled in the first mode, a case where actuator 232 and motor 220 are controlled in the second mode before engine rotation speed Ne attains to zero, and a case where actuator 232 and motor 220 are controlled in the second mode after engine rotation speed Ne has attained to zero, respectively.

In the case where actuator 232 and motor 220 are controlled in the first mode, a first threshold value VS1 is employed. In the case where actuator 232 and motor 220 are controlled in the second mode before engine rotation speed Ne attains to zero, a second threshold value VS2 is employed. In the case where actuator 232 and motor 220 are controlled in the second mode after engine rotation speed Ne has attained to zero, a third threshold value VS3 is employed.

First threshold value VS1 is higher than second threshold value VS2. Second threshold value VS2 is higher than third threshold value VS3. First threshold value VS1, second threshold value VS2, and third threshold value VS3 are predetermined by a developer based on results in experiments, simulation, and the like.

Figure 6:
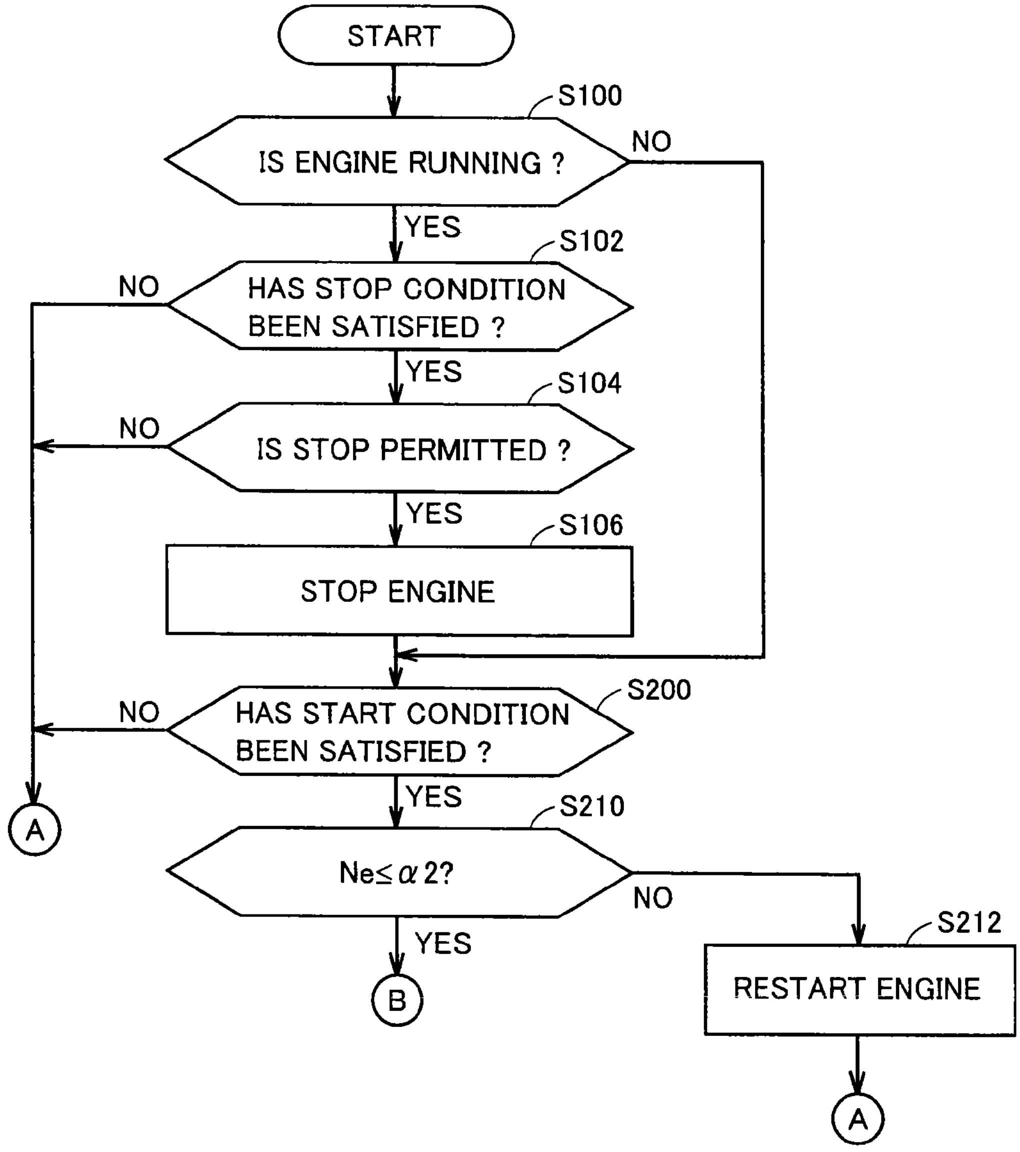
FIG. 6 is a flowchart (No. 1) showing processing performed by an ECU in the first embodiment.
Figure 7:
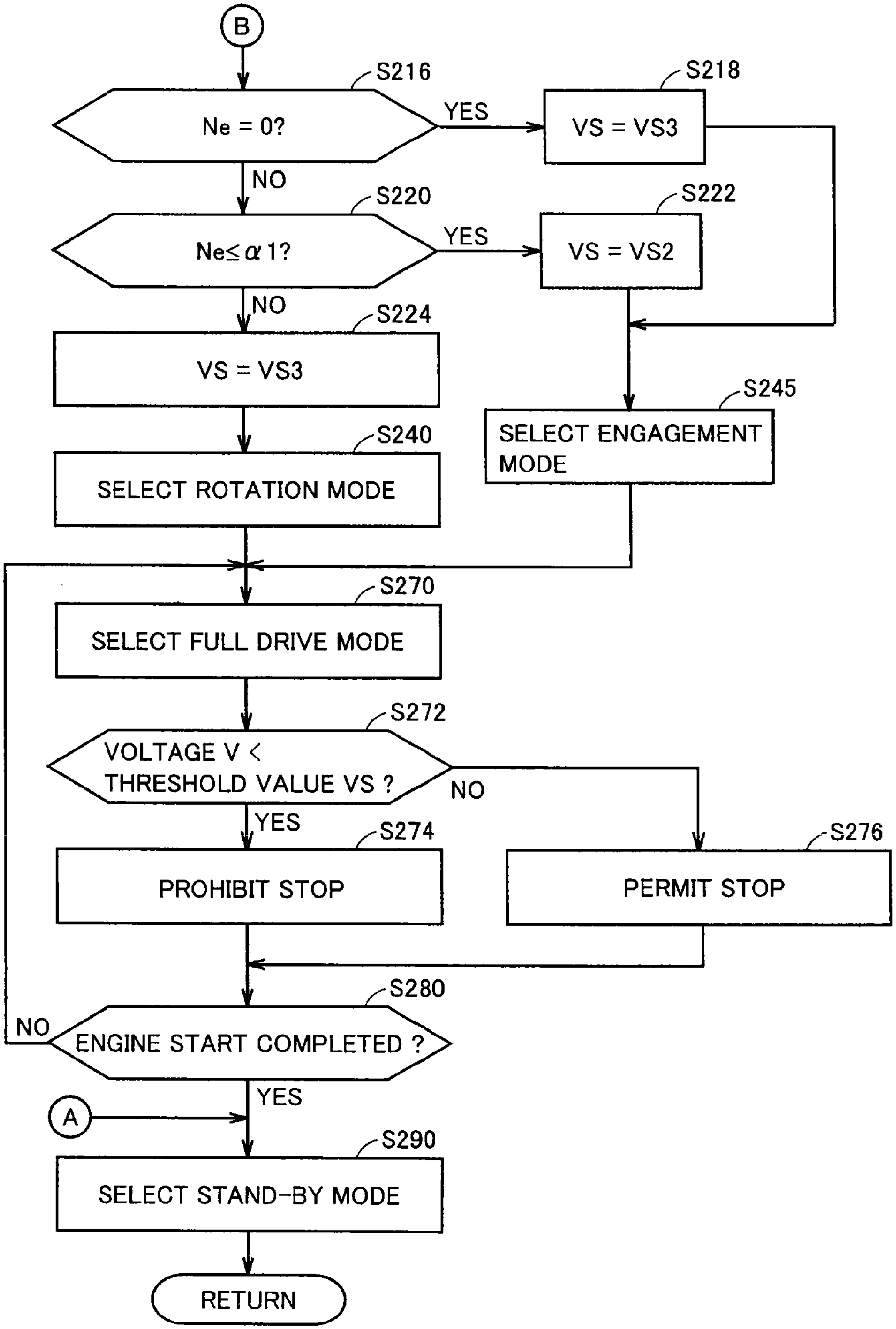
FIG. 7 is a flowchart (No. 2) showing processing performed by the ECU in the first embodiment.

Processing performed by ECU 300 for stopping and starting engine 100 will be described below with reference to FIGS. 6 and 7. The flowcharts shown in FIGS. 6 and 7 are realized by executing a program stored in advance in ECU 300 in a prescribed cycle. Alternatively, regarding some steps, processing can also be performed by constructing dedicated hardware (electronic circuitry).

In step (hereinafter the step being abbreviated as S) 100, ECU 300 determines whether or not engine 100 is operating. When engine 100 is operating (YES in S100), ECU 300 determines in S102 whether or not a condition for stopping engine 100 has been satisfied. Namely, whether or not to stop engine 100 is determined.

When a condition for stopping engine 100 is not satisfied, for example, because of restriction of stop of engine 100 (NO in S102), the operation of engine 100 is continued. In this case, the process proceeds to S290 and ECU 300 selects the stand-by mode as the operation mode for starter 200.

When a condition for stopping engine 100 is satisfied because stop of engine 100 is not restricted (YES in S102), ECU 300 causes engine 100 to stop in S106. Therefore, fuel injection and combustion in engine 100 is stopped.

Thereafter, in S200, ECU 300 determines whether or not a condition for starting engine 100 has been satisfied or not. Namely, whether or not to start engine 100 is determined. When a condition for starting engine 100 is not satisfied (NO in S200), the process proceeds to S290 and ECU 300 selects the stand-by mode as the operation mode for starter 200 because an operation to start engine 100 is not necessary.

When a condition for starting engine 100 is satisfied (YES in S200), the process proceeds to S210 and ECU 300 then determines whether or not rotation speed Ne of engine 100 is equal to or lower than second reference value α2.

When rotation speed Ne of engine 100 is higher than second reference value α2 (NO in S210), engine rotation speed Ne corresponds to region 1 in FIG. 3 where engine 100 can return by itself. Therefore, ECU 300 causes the process to proceed to S212 and selects the stand-by mode. Thereafter, ECU 300 resumes fuel injection and combustion in order to re-start engine 100 in S214.

When rotation speed Ne of engine 100 is equal to or lower than second reference value α2 (YES in S210), ECU 300 determines in S216 whether or not rotation speed Ne of engine 100 is zero.

When rotation speed Ne of engine 100 is zero (YES in S216), in S218, ECU 300 selects third threshold value VS3 which is lowest among first threshold value VS1, second threshold value VS2, and third threshold value VS3, as threshold value VS to be compared with a voltage of battery 120.

Furthermore, when rotation speed Ne of engine 100 is zero (YES in S220), engine rotation speed Ne is included in region 3 in FIG. 3, and therefore the process proceeds to S245 and ECU 300 selects the engagement mode as the operation mode for starter 200. Then, ECU 300 outputs control signal SE1 so as to close relay RY1, and thus actuator 232 is driven. Here, motor 220 is not driven.

Thereafter, the process proceeds to S270 and ECU 300 selects the full drive mode as the operation mode for starter 200. Then, motor 220 is driven in order to crank engine 100.

When the voltage of battery 120 becomes lower than threshold value VS while motor 220 is driven (YES in S272), ECU 300 restricts in S274 stop of engine 100. In the case where rotation speed Ne of engine 100 is zero, when the voltage of battery 120 becomes lower than third threshold value VS3 while motor 220 is driven, stop of engine 100 is restricted. When stop of engine 100 is restricted, a stop condition is thereafter not satisfied. Therefore, automatic stop of engine 100, that is, idling-stop or economy-running, is restricted, and engine 100 is continuously operated.

Unless the voltage of battery 120 becomes lower than threshold value VS while motor 220 is driven (NO in S272), ECU 300 permits in S276 stop of engine 100.

Then, in S280, ECU 300 determines whether or not start of engine 100 has been completed. Determination of completion of start of engine 100 may be made, for example, based on whether or not the engine rotation speed is higher than a threshold value γ indicating the self-sustained operation after lapse of a prescribed period of time since start of drive of motor 220.

When start of engine 100 has not been completed (NO in S280), the process returns to S270 and cranking of engine 100 is continued.

When start of engine 100 has been completed (YES in S280), the process proceeds to S290 and ECU 300 selects the stand-by mode as the operation mode for starter 200.

When rotation speed Ne of engine 100 is higher than zero (NO in S216), ECU 300 determines whether or not rotation speed Ne of engine 100 is equal to or lower than first reference value α1 (0<α1).

When rotation speed Ne of engine 100 is equal to or lower than first reference value α1 (YES in S220), ECU 300 selects in S222 second threshold value VS2 among first threshold value VS1, second threshold value VS2, and third threshold value VS3, as threshold value VS to be compared with a voltage of battery 120.

When rotation speed Ne of engine 100 is equal to or lower than first reference value α1 (YES in S220), engine rotation speed Ne corresponds to region 3 in FIG. 3. Therefore, the process proceeds to S245 and ECU 300 selects the engagement mode as the operation mode for starter 200. Then, ECU 300 outputs control signal SE1 so as to close relay RY1, and thus actuator 232 is driven. Here, motor 220 is not driven.

Thereafter, the process proceeds to S270 and ECU 300 selects the full drive mode as the operation mode for starter 200. Then, starter 200 starts cranking of engine 100.

When the voltage of battery 120 becomes lower than threshold value VS while motor 220 is driven (YES in S272), ECU 300 restricts in S274 stop of engine 100. In the case where rotation speed Ne of engine 100 is higher than zero and equal to or lower than first reference value α1, when the voltage of battery 120 becomes lower than second threshold value VS2 while motor 220 is driven, stop of engine 100 is restricted.

When start of engine 100 has not been completed (NO in S280), the process returns to S270 and cranking of engine 100 is continued.

When start of engine 100 has been completed (YES in S280), the process proceeds to S290 and ECU 300 selects the stand-by mode as the operation mode for starter 200.

When rotation speed Ne of engine 100 is higher than first reference value α1 (NO in S220), ECU 300 selects in S224 first threshold value VS1 which is highest among first threshold value VS1, second threshold value VS2, and third threshold value VS3, as threshold value VS to be compared with a voltage of battery 120.

When rotation speed Ne of engine 100 is higher than first reference value α1 (NO in S220), ECU 300 selects in S240 the rotation mode as the operation mode for starter 200. Then, ECU 300 outputs control signal SE2 so as to close relay RY2, and thus motor 220 is driven. Here, actuator 232 is not driven.

Then, ECU 300 selects in S270 the full drive mode as the operation mode for starter 200. Thus, actuator 232 is driven, pinion gear 260 and ring gear 110 are engaged with each other, and engine 100 is cranked.

When the voltage of battery 120 becomes lower than threshold value VS while motor 220 is driven (YES in S272), ECU 300 restricts in S274 stop of engine 100. In the case where rotation speed Ne of engine 100 is higher than first reference value α1, when the voltage of battery 120 becomes lower than first threshold value VS1 while motor 220 is driven, stop of engine 100 is restricted.

When start of engine 100 has not been completed (NO in S280), the process returns to S270 and cranking of engine 100 is continued.

When start of engine 100 has been completed (YES in S280), the process proceeds to S290 and ECU 300 selects the stand-by mode as the operation mode for starter 200.

As described above, in the present embodiment, engine 100 is stopped when the predetermined stop condition is satisfied. When the predetermined start condition is satisfied, motor 220 in starter 200 is driven and engine 100 is cranked. When a voltage of battery 120 for supplying electric power to motor 220 becomes lower than threshold value VS while motor 220 is driven, stop of engine 100 is thereafter restricted. The threshold value is higher as engine rotation speed Ne at the time when motor 220 is driven is higher. Therefore, even though an amount of lowering in voltage at the time when motor 220 is driven while engine rotation speed Ne is high is smaller than an amount of lowering in voltage at the time when motor 220 is driven while engine rotation speed Ne is low, with the voltage of battery 120 being insufficient, the voltage of battery 120 can be lower than threshold value VS. Therefore, even though a stop condition is thereafter satisfied, engine 100 is continuously operated.

Second Embodiment

Figure 8:
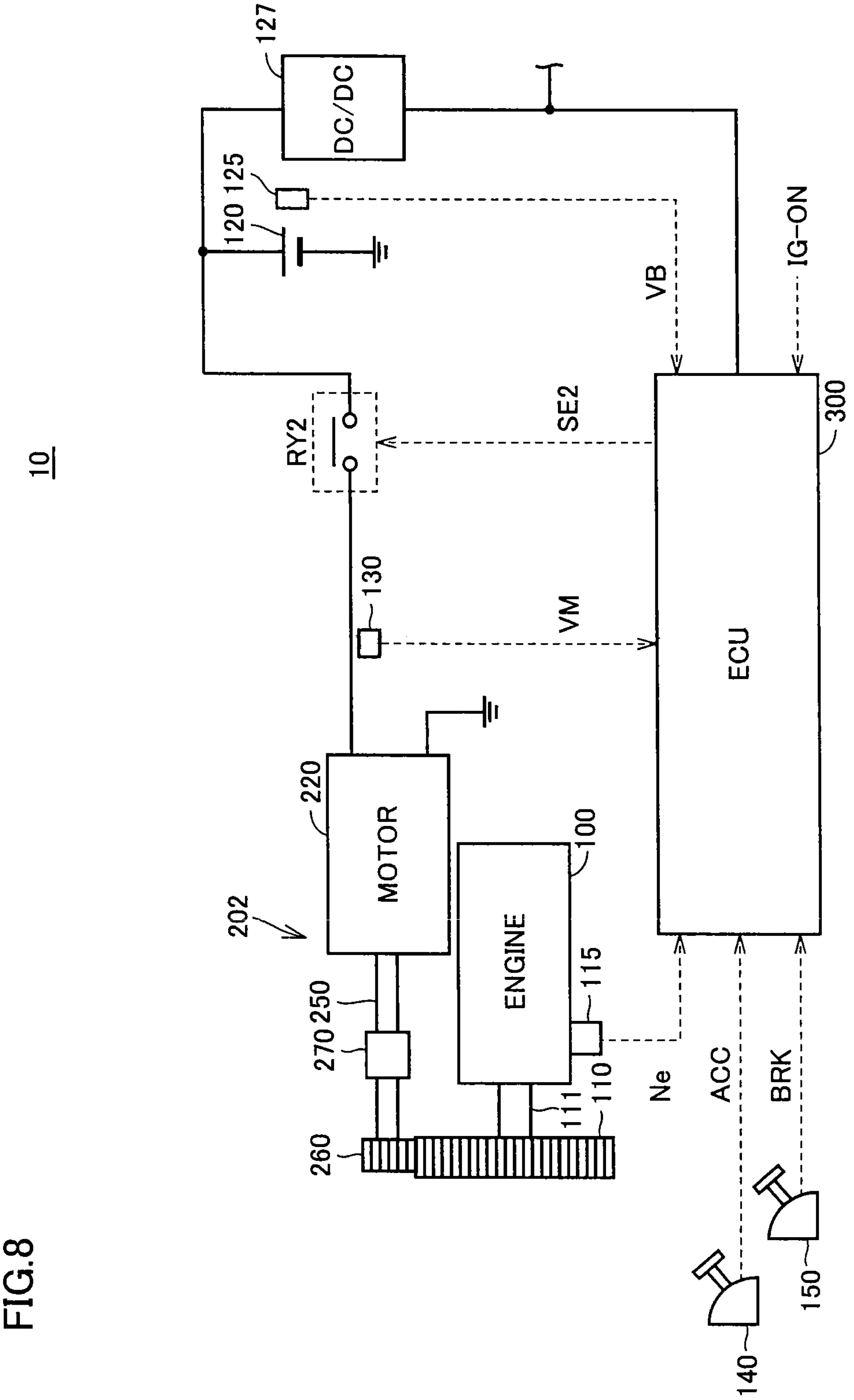
FIG. 8 is an overall block diagram of a vehicle in a second embodiment.

A second embodiment will be described below with reference to FIG. 8. A starter 202 in the present embodiment is different from starter 200 in the first embodiment in that pinion gear 260 is always engaged with ring gear 110.

Starter 202 in the present embodiment has a one-way clutch 270 instead of the actuator. One-way clutch 270 is provided on output member 250. One-way clutch 270 allows engine rotation speed Ne to be greater than the rotation speed of motor 220.

Other features of engine 100 are the same. Therefore, detailed description thereof will not be repeated here.

Figure 9:
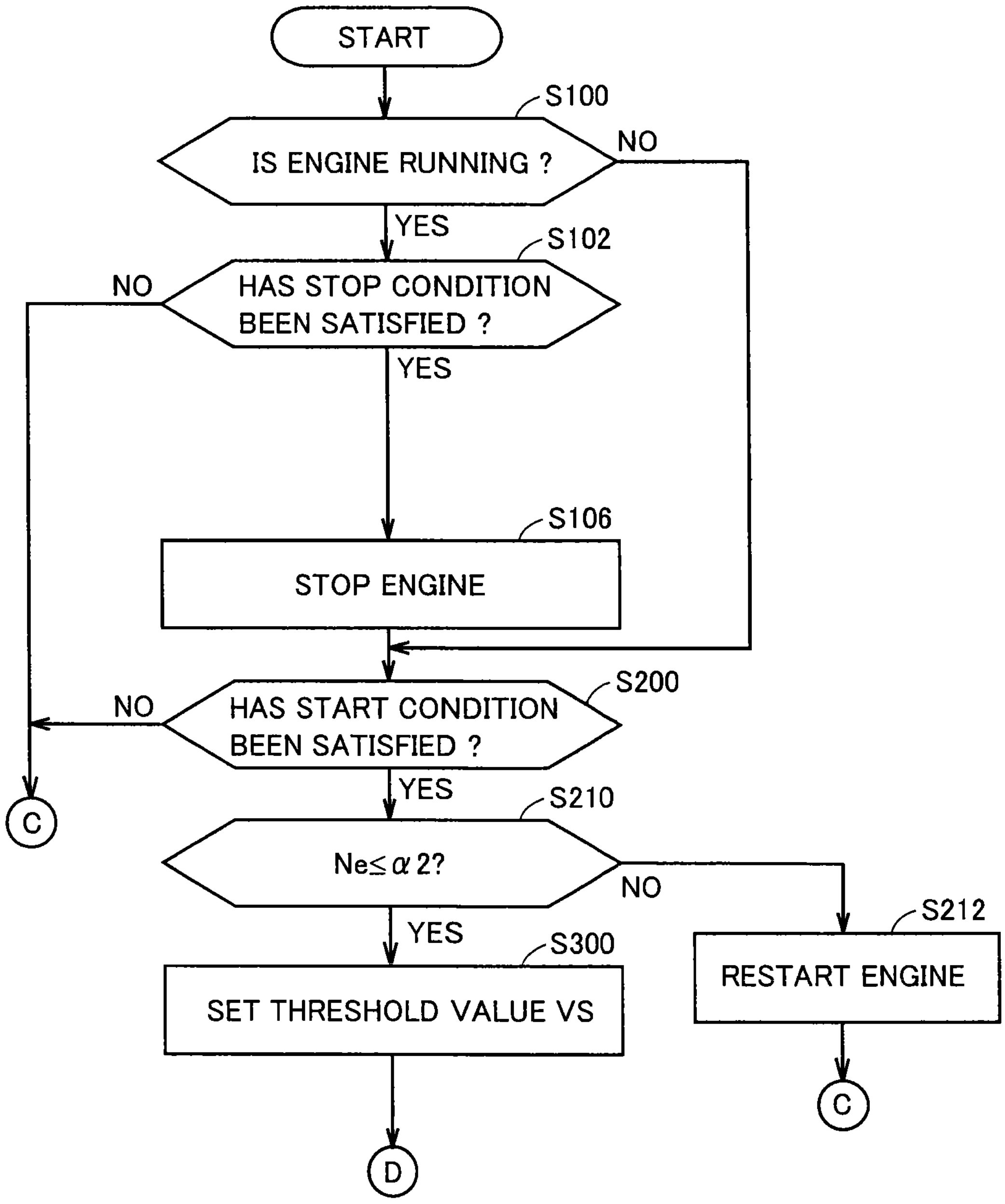
FIG. 9 is a flowchart (No. 1) showing processing performed by the ECU in the second embodiment.
Figure 10:
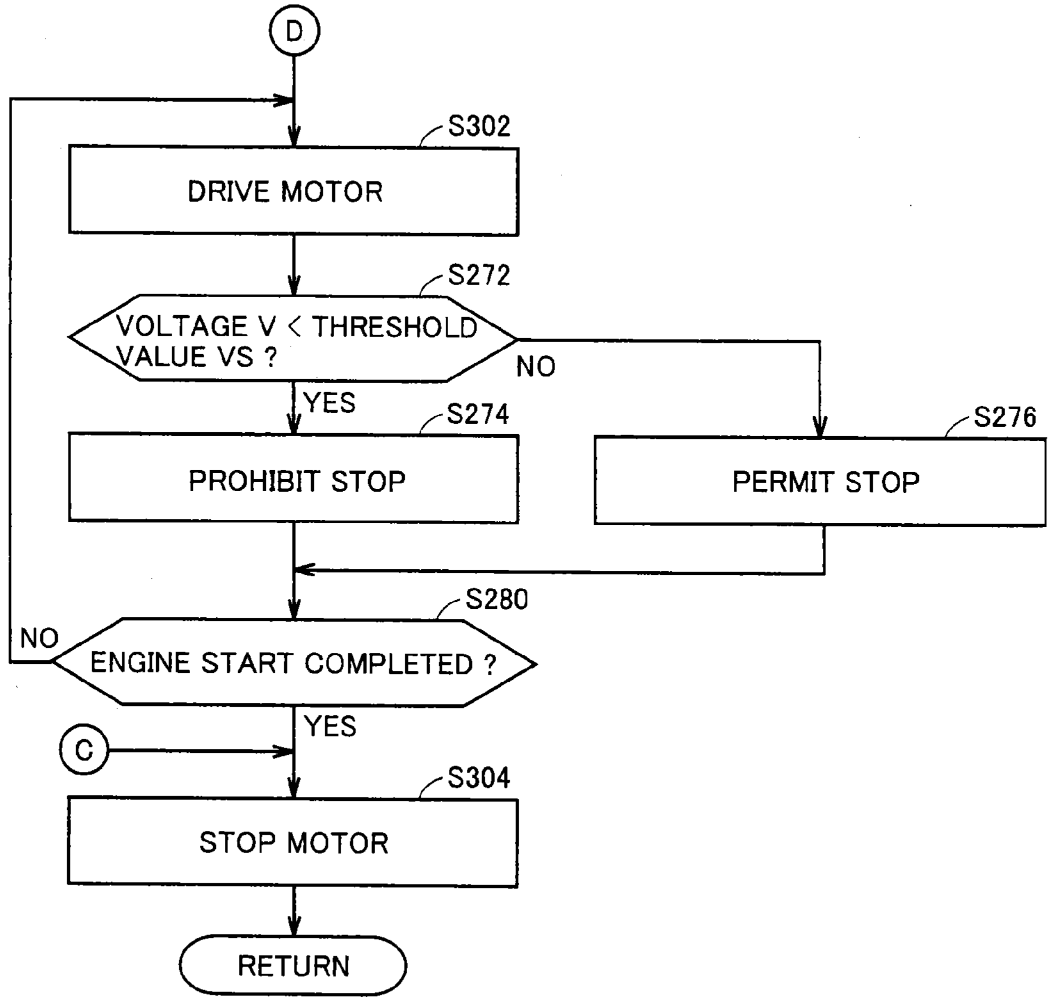
FIG. 10 is a flowchart (No. 2) showing processing performed by the ECU in the second embodiment.

Processing performed by ECU 300 for stopping and starting engine 100 in the present embodiment will be described below with reference to FIGS. 9 and 10. The flowcharts shown in FIGS. 9 and 10 are realized by executing a program stored in advance in ECU 300 in a prescribed cycle. Alternatively, some processing can also be performed by constructing dedicated hardware (electronic circuitry).

The processing the same as in the first embodiment described previously has the same reference number allotted. Therefore, detailed description thereof will not be repeated here.

Figure 11:
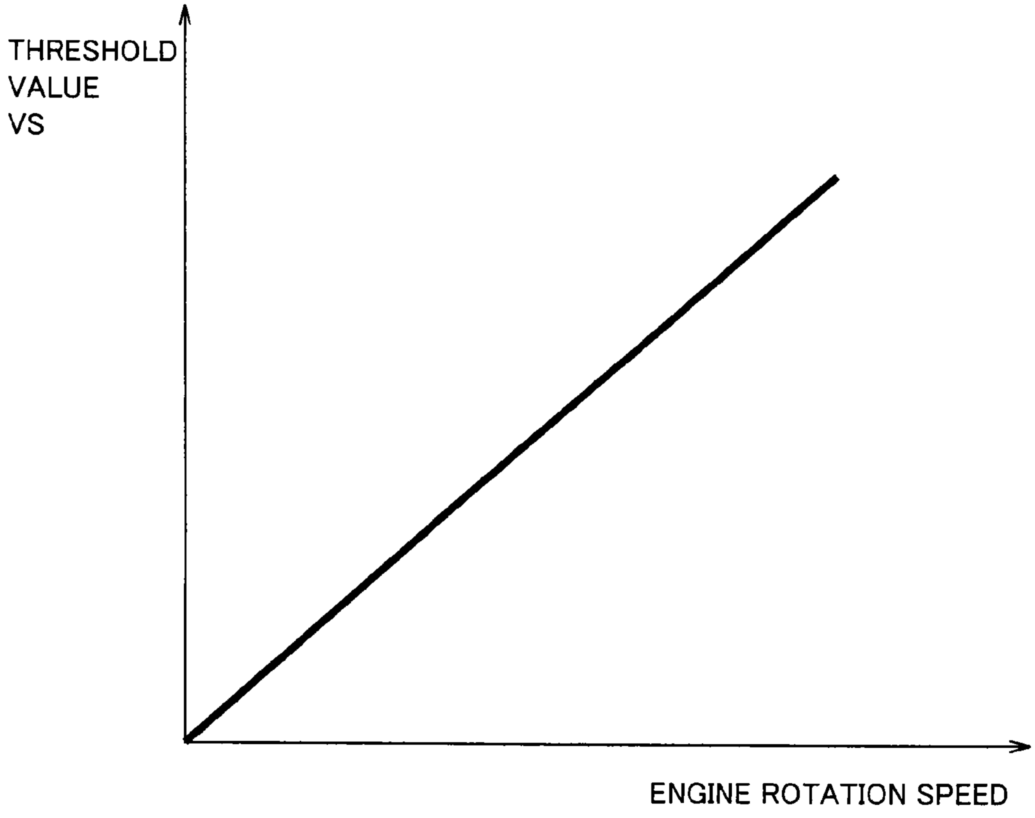
FIG. 11 is a diagram showing a threshold value VS.

When rotation speed Ne of engine 100 is equal to or lower than second reference value α2 (YES in S210), ECU 300 sets in S300 threshold value VS to be compared with a voltage of battery 120 in accordance with engine rotation speed Ne. For example, as shown in FIG. 11, threshold value VS is set to be higher as engine rotation speed Ne is higher. More specifically, threshold value VS is set to be higher as engine rotation speed Ne at the time when the voltage is lowest while motor 220 is driven is higher. Threshold value VS may be set to be higher as engine rotation speed Ne at the time when a start condition is satisfied is higher. Threshold value VS may be set to be higher as engine rotation speed Ne at the time when drive of motor 220 is started is higher. Furthermore, a proper rotation speed may be employed as appropriate as engine rotation speed Ne to be employed for setting threshold value VS.

Referring to FIG. 10, in S302, ECU 300 drives motor 220 in order to crank engine 100.

When start of engine 100 has been completed (YES in S280), the process proceeds to S304 and ECU 300 stops motor 220.

By doing so as well, an effect similar to that in the first embodiment can be achieved. Furthermore, engine 100 may be cranked by an alternator.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

10 vehicle; 100 engine; 110 ring gear; 111 crankshaft; 115 rotation speed sensor; 120 battery; 125, 130 voltage sensor; 140 accelerator pedal; 150 brake pedal; 160 powertrain; 170 drive wheel; 200, 202 starter; 210 plunger; 220 motor; 230 solenoid; 232 actuator; 240 coupling portion; 245 fulcrum; 250 output member; 260 pinion gear; 270 one-way clutch; 300 ECU; 410 stand-by mode; 420 engagement mode; 430 rotation mode; 440 full drive mode; and RY1, RY2 relay.

The invention claimed is:

1. A control device for an engine which is stopped when a predetermined stop condition is satisfied and cranked by a motor when a predetermined start condition is satisfied after it is stopped, comprising:

a control unit that restricts stop of said engine after a voltage of a battery supplying electric power to said motor becomes lower than a threshold value while said motor is driven and said engine is cranked, wherein said threshold value increases as a rotation speed of said engine at a time when said motor is driven increases.

2. The control device for an engine according to claim 1, wherein said engine is provided with a starter including a second gear that can be engaged with a first gear coupled to a crankshaft and an actuator that moves, in a driven state, said second gear to a position where said second gear is engaged with said first gear, said motor rotates said second gear, said control unit includes a first mode in which said motor is driven before said actuator is driven and a second mode in which said second gear is engaged with said first gear by said actuator before said motor is driven, and said actuator and said motor are driven in said first mode at a rotation speed higher than the rotation speed of said engine at the time when said actuator and said motor are driven in said second mode.

3. The control device for an engine according to claim 2, wherein said threshold value includes a threshold value used in said first mode and a threshold value used in said second mode, and the threshold value used in said first mode is higher than the threshold value used in said second mode.

4. The control device for an engine according to claim 2, wherein said actuator and said motor are driven in said second mode when the rotation speed of said engine is higher than zero and equal to or lower than a predetermined rotation speed at a time when said start condition is satisfied, said control unit includes, in addition to said first mode and said second mode, a third mode in which said second gear is engaged with said first gear by said actuator before said motor is driven, when the rotation speed of said engine is zero at the time when said start condition is satisfied, said threshold value includes a threshold value used in said first mode, a threshold value used in said second mode, and a threshold value used in said third mode, the threshold value used in said first mode is higher than the threshold value used in said second mode, and the threshold value used in said second mode is higher than the threshold value used in said third mode.

5. The control device for an engine according to claim 2, wherein said actuator and said motor are driven in said second mode when the rotation speed of said engine is higher than zero and equal to or lower than a predetermined rotation speed at a time when said start condition is satisfied, said control unit includes, in addition to said first mode and said second mode, a third mode in which said second gear is engaged with said first gear by said actuator before said motor is driven, when the rotation speed of said engine is zero at the time when said start condition is satisfied, said threshold value includes a threshold value used in said second mode and a threshold value used in said third mode, and the threshold value used in said second mode is higher than the threshold value used in said third mode.

6. The control device for an engine according to claim 2, wherein said actuator and said motor are driven in said second mode when the rotation speed of said engine is higher than zero and equal to or lower than a predetermined rotation speed at a time when said start condition is satisfied, said control unit includes, in addition to said first mode and said second mode, a third mode in which said second gear is engaged with said first gear by said actuator before said motor is driven, when the rotation speed of said engine is zero at the time when said start condition is satisfied, said threshold value includes a threshold value used in said first mode and a threshold value used in said third mode, and the threshold value used in said first mode is higher than the threshold value used in said third mode.

7. A control device for an engine which is stopped when a predetermined stop condition is satisfied and cranked by a motor when a predetermined start condition is satisfied after it is stopped, comprising:

a control unit that restricts stop of said engine in accordance with a voltage of a battery supplying electric power to said motor while said motor is driven and said engine is cranked, wherein the voltage of said battery at a time when stop of said engine is restricted increases as a rotation speed of said engine at a time when said motor is driven increases.

* * * * *